No. 860,595. PATENTED JULY 16, 1907.
C. G. CURTIS.
ELASTIC FLUID TURBINE.
APPLICATION FILED JULY 5, 1902.
7 SHEETS—SHEET 1.
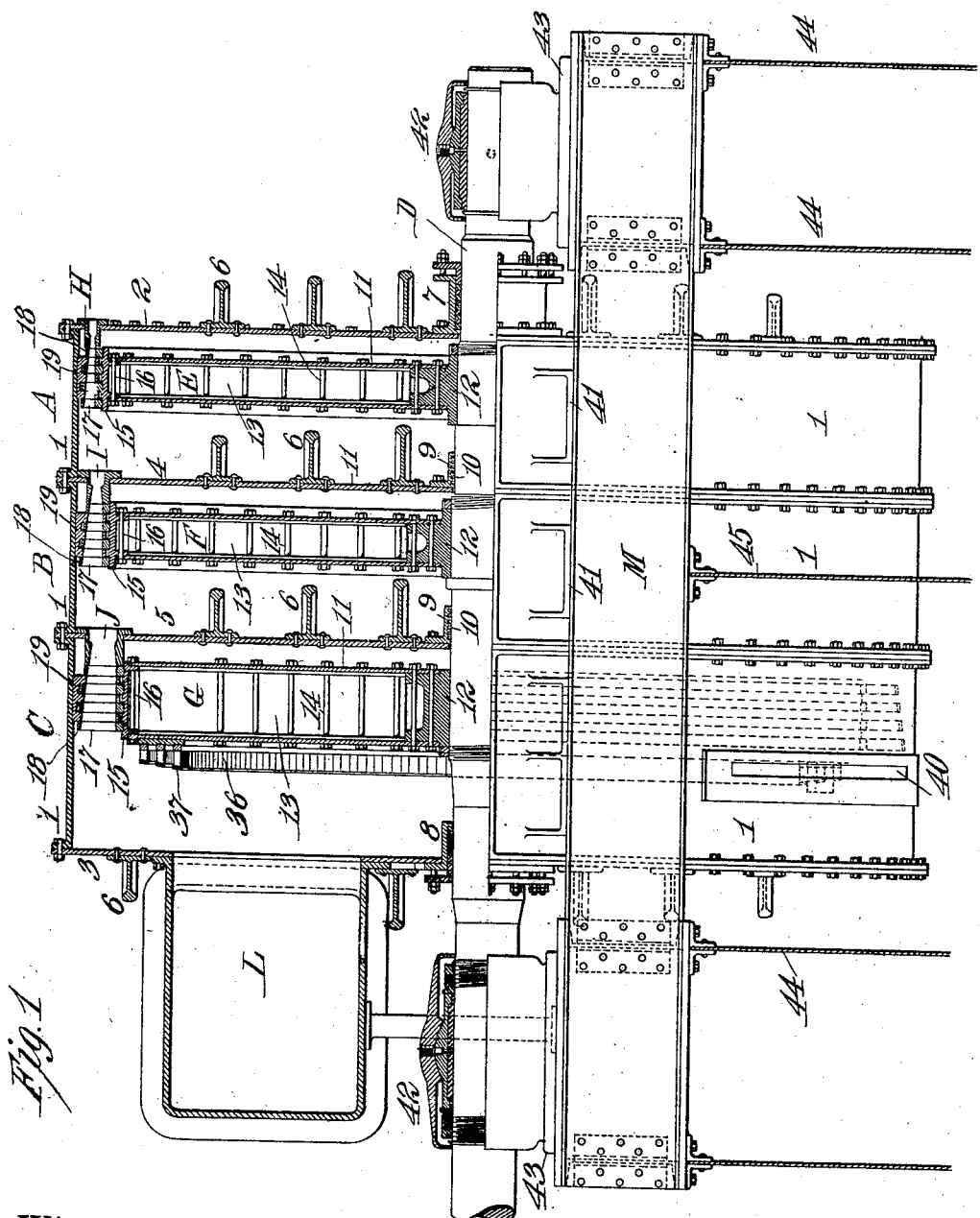
Witnesses:
Jas. F. Coleman
Jno. Rob't Taylor
Inventor
Charles G. Curtis
By Dyer & Dyer
Att'ys.

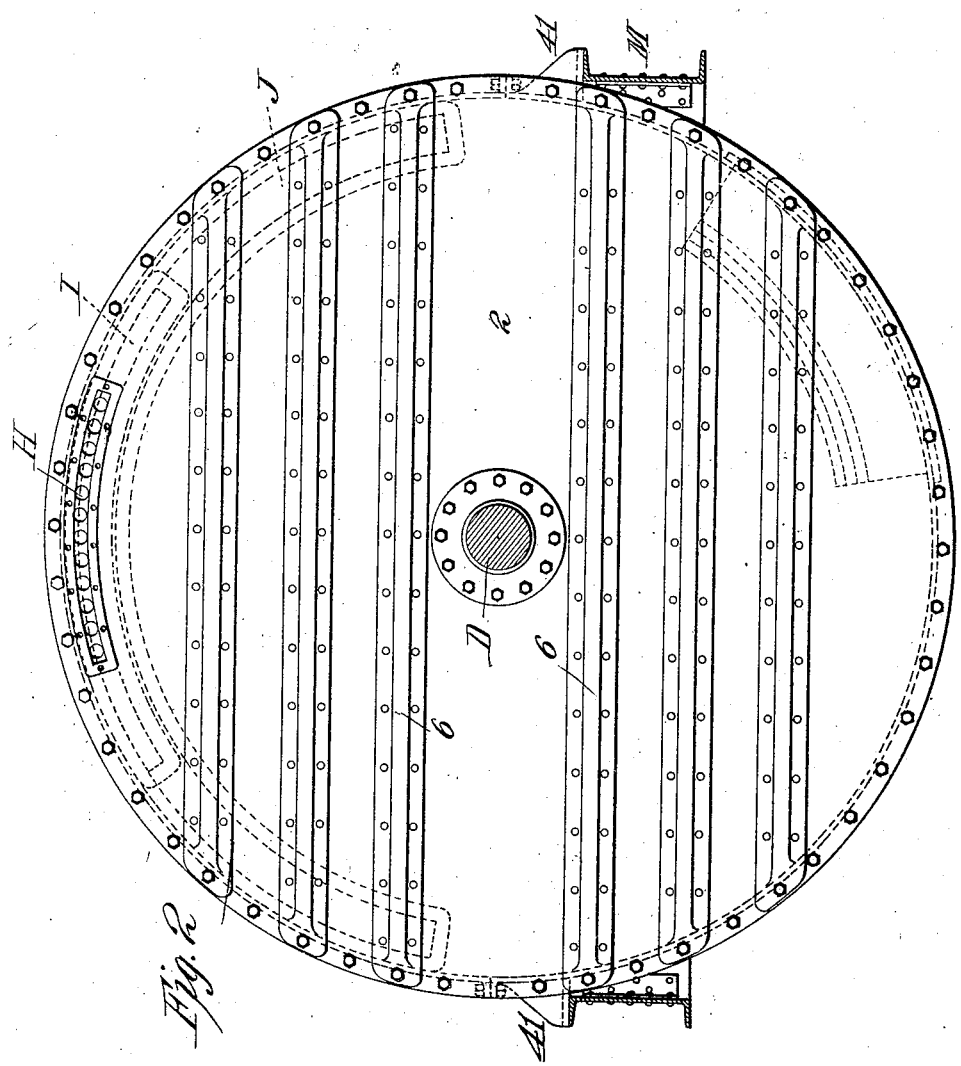

No. 860,595. PATENTED JULY 16, 1907.
C. G. CURTIS.
ELASTIC FLUID TURBINE.
APPLICATION FILED JULY 5, 1902.
7 SHEETS—SHEET 3.
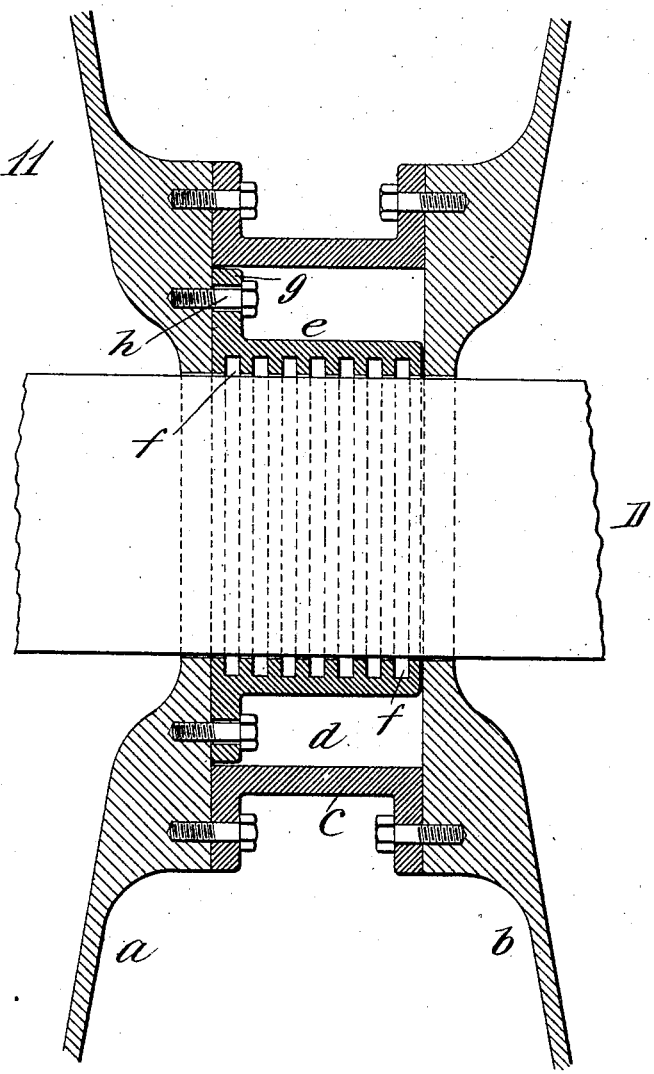

No. 860,595. PATENTED JULY 16, 1907.
C. G. CURTIS.
ELASTIC FLUID TURBINE.
APPLICATION FILED JULY 5, 1902.
7 SHEETS—SHEET 4.
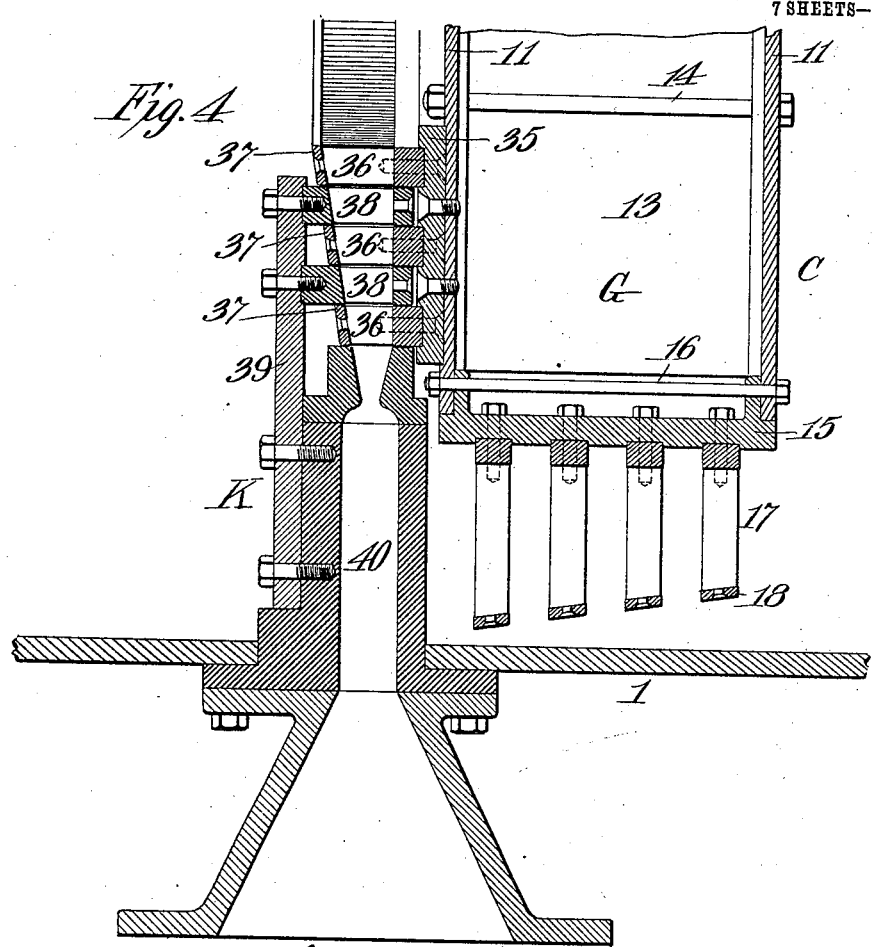
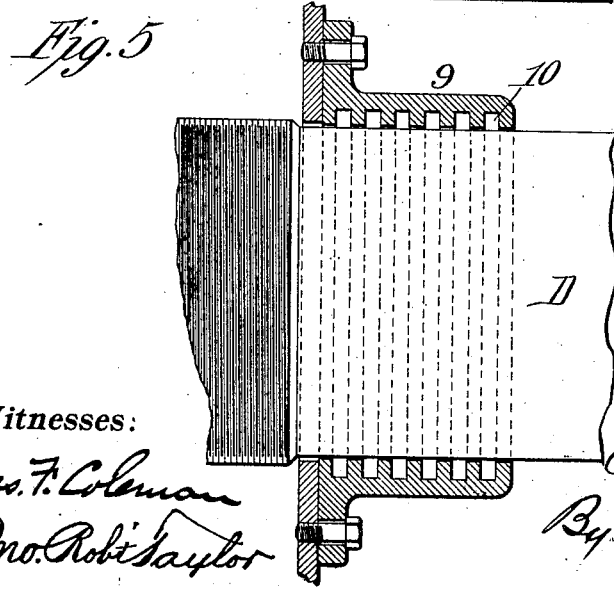
Witnesses:
Inventor
Charles G. Curtis
By Dyer Edmonds & Dyer
Att'ys No. 860,595. PATENTED JULY 16, 1907.
C. G. CURTIS.
ELASTIC FLUID TURBINE.
APPLICATION FILED JULY 5, 1902.
7 SHEETS—SHEET 5.
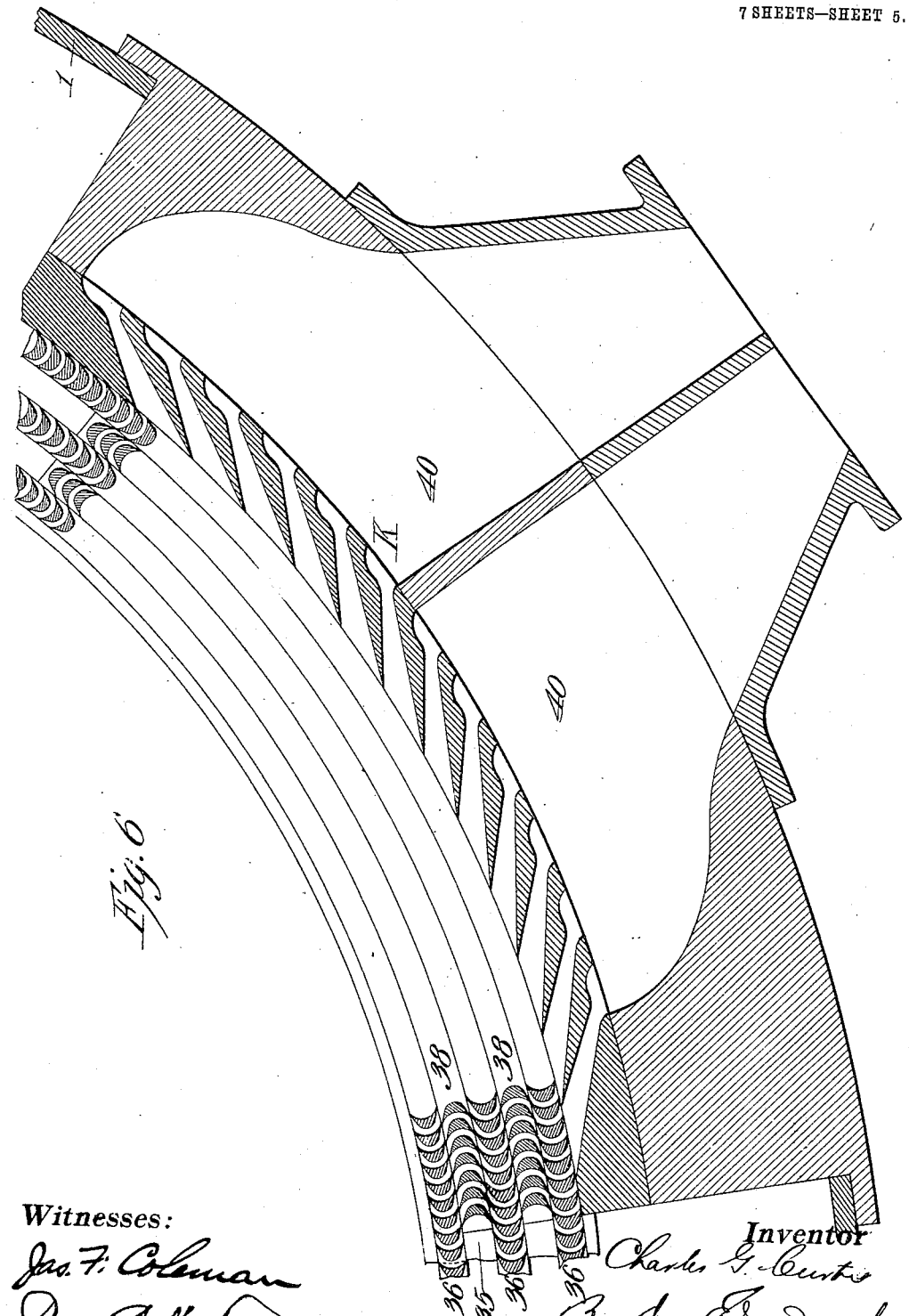

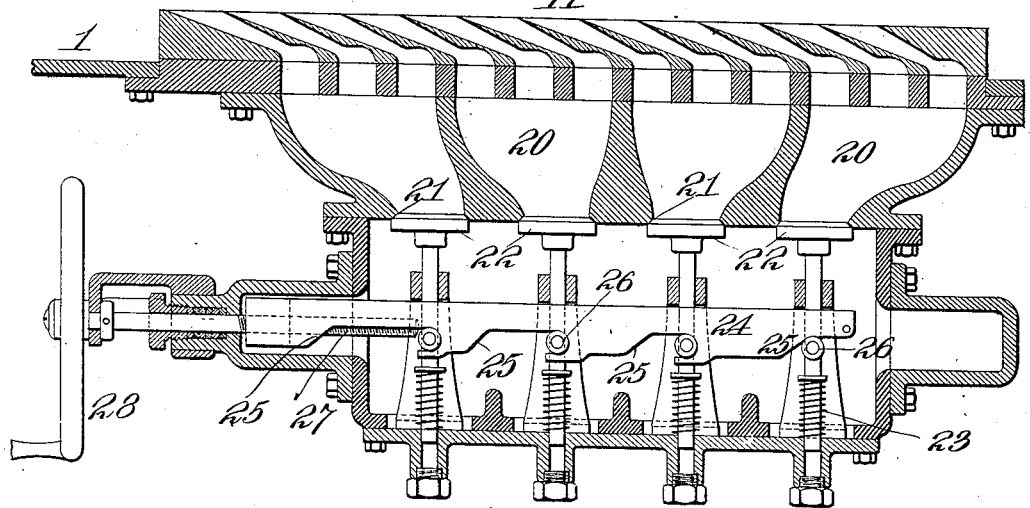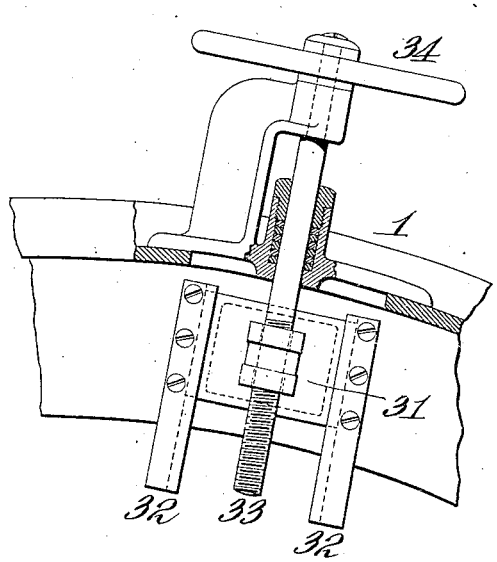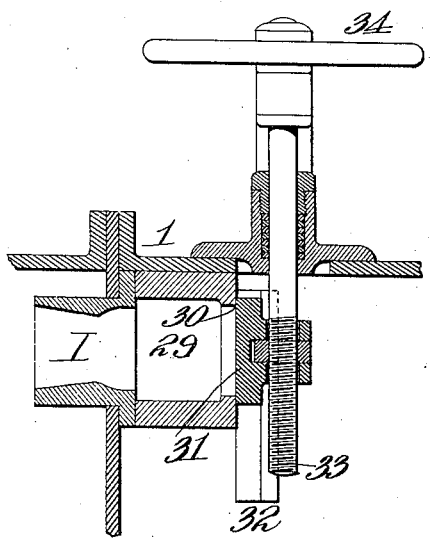

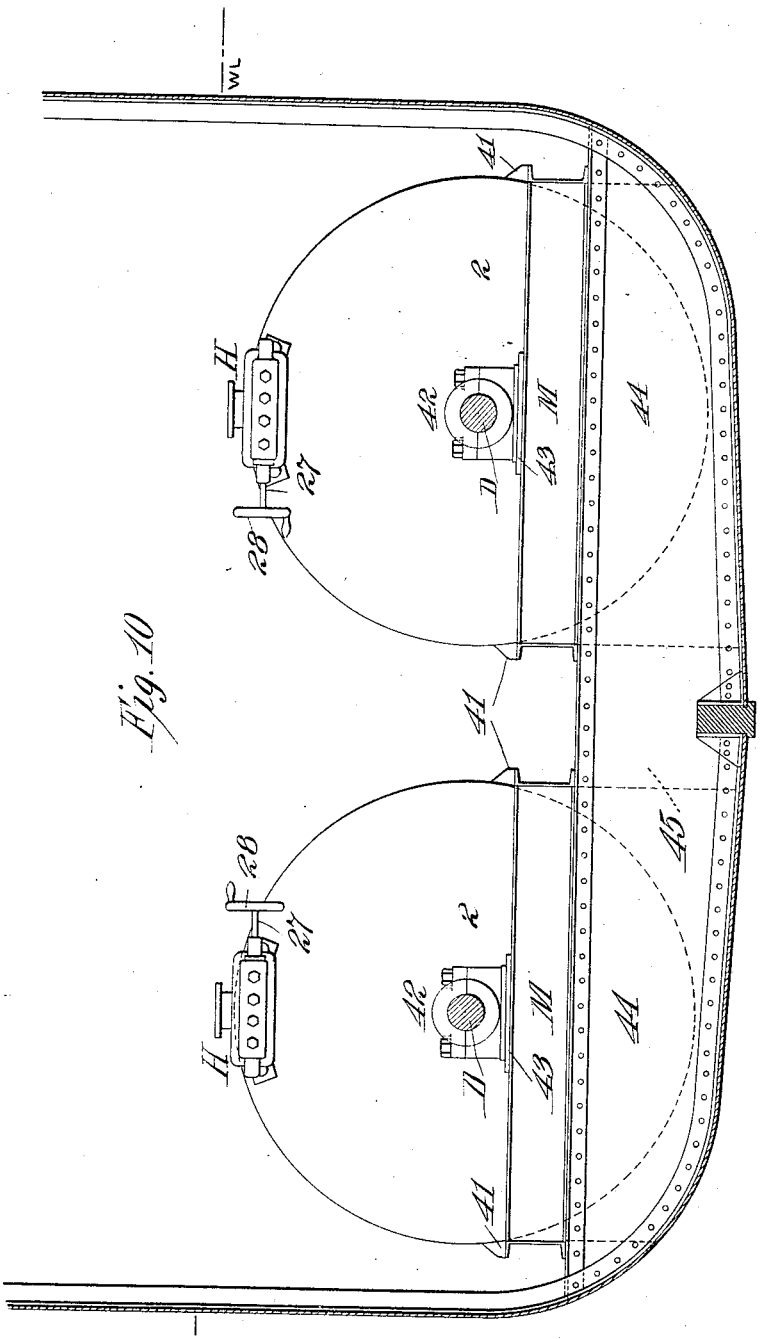

UNITED STATES PATENT OFFICE.

CHARLES G. CURTIS, OF NEW YORK, N. Y., ASSIGNOR, BY MESNE ASSIGNMENTS, TO GENERAL ELECTRIC COMPANY, A CORPORATION OF NEW YORK.

ELASTIC-FLUID TURBINE.

No. 860,595.   Specification of Letters Patent.   Patented July 16, 1907.

Application filed July 5, 1902. Serial No. 114,357.

*To all whom it may concern:*

Be it known that I, CHARLES G. CURTIS, a citizen of the United States, residing in the borough of Manhattan, city of New York, State of New York, have invented a certain new and useful Improvement in Elastic-Fluid Turbines, of which the following is a description.

My invention relates to improvements in elastic fluid turbines of the type covered by my Patents 566,967, 566,968 and 566,969.

The invention consists in the features of novelty hereinafter described and pointed out in the claims.

In the accompanying drawings, Figure 1 is a side elevation of the turbine with the upper half in section, the nozzle controlling valves being omitted; Fig. 2 is an end elevation showing the head of the first section of the turbine, the shaft and supporting frame being in section, the valve case of the first stage nozzle being removed, and the size and location of the nozzles for the second and third stages and the reversing nozzle being indicated by dotted lines; Fig. 3 is a plan view of one of the strengthening beams secured to the heads and partitions of the shell; Fig. 4 is a radial section on a large scale through the nozzle and vanes for producing the reverse or backward rotation of the turbine; Fig. 5 is a section through one of the sleeves which surround the shaft at the partitions between stages for preventing excessive leakage; Fig. 6 is a longitudinal section through the reversing nozzle and reversing movable and stationary vanes, the vanes opposite the center of the nozzle being omitted; Fig. 7 is a longitudinal section through the nozzle of the first stage of the turbine and through the valve case, illustrating the valve mechanism for controlling the sections of the nozzle; Figs. 8 and 9 are sections at right angles, illustrating the valve for controlling individual divisions of the nozzles of the subsequent stages of the turbine; Fig. 10 is a cross-section of the hull of a vessel representing two of my turbines supported therein; and Fig. 11 is a sectional view of the adjoining heads of the shells of two sections of a turbine in which the sections are inclosed in separate shells, showing the omission of packing around the shaft between the sections of a turbine of this character.

The turbine illustrated in the drawings is specially designed for marine work, but the several features of invention may be employed in turbines used for other purposes.

The turbine illustrated in Figs. 1 to 10 is one having three stages of expansion, A, B and C, on the principle described in my Patent No. 566,969. The shell of the turbine is made up of semicircular plates 1 having outwardly turned edges and presenting a shape in cross-section similar to a channel-iron. These semicircular plates are flanged at their meeting ends, and are bolted together so that the shell can be separated at the horizontal center. The shell is closed at the ends by head plates 2, 3, and is divided by diaphragm or partition plates 4, 5, the head and partition plates being bolted to the flanges of the curved plates 1. These head and partition plates are not split at the center, but are slipped over the shaft. The head and partition plates are strengthened by beams 6 which cross them at intervals and are riveted thereto. These beams cross the head and partition plates as chords of arcs, instead of being placed radially, as is usual with strengthening ribs on disks. The beams are T-shape in cross-section with enlarged heads similar to railroad rails. They are preferably higher and hence stronger at the center than at the ends (Fig. 3) to correspond with the strain to which they are subjected. The shell and the head and partition plates are preferably made of wrought steel, while the beams 6 are preferably made of cast steel.

D is the shaft which passes centrally through the shell and is surrounded by stuffing boxes 7, 8 at the heads 2, 3. Where the shaft passes through the diaphragm or partition plates which separate the stages, packing is not employed, because in a construction in which the two or more stages are inclosed in a single shell divided by partitions or diaphragms, it is difficult to get at the packing to keep it in order. I have found that the leakage between the wheel chambers within the shell may be reduced to an unimportant amount by providing the partitions with sleeves 9 which surround the shaft and fit it closely but without touching, and by giving these sleeves a sufficient extension along the shaft the leakage becomes inconsiderable. To further reduce the leakage, these sleeves 9 are provided with baffling grooves 10 on their bores adjoining the shaft. Where the sections of the turbine are inclosed in separate shells, as illustrated in my application for patent filed November 16th 1901 (Serial No. 82,570), the packing around the shaft between sections may be omitted and the leakage reduced by the employment of similar devices. This is illustrated in Fig. 11, in which $a\ b$ are the heads of adjoining sections of the turbine. These heads are connected by a flanged ring $c$ which surrounds the shaft and is bolted to the heads $a\ b$, securing the heads firmly together and forming a chamber $d$ which connects the shells around the shaft. In the chamber $d$ is located a sleeve $e$ provided with baffling grooves $f$ in its bore surrounding the shaft. This sleeve has a flange $g$ at one end, which is secured to one of the heads by bolts $h$, the holes in the flange $g$ through which the bolts $h$ pass being somewhat larger than the bolts, so that the sleeve $e$ can be adjusted to a concentric position around the shaft. The elastic fluid leaks from one shell to the other through the chamber $d$, but this leakage is reduced to an unimportant amount by means of the sleeve $e$. In the wheel chambers and mounted upon the shaft are the three wheels E, F, G, each constructed of disks 11 mounted upon a hub 12 secured to the shaft and stiffened by radial web plates 13 and cross bolts 14. The wheel rims 15, made in one or in several pieces, are secured to the peripheries of the disks 11 by cross bolts 16. The rims 15 carry movable vanes 17 which are cut in blocks secured to the rims, the vane spaces being closed at their outer ends by bands 18. Intermediate stationary vanes are supported from the shell by blocks 19 in line with the nozzles. Each stage of the turbine is therefore provided with two or more sets of movable vanes and one or more sets of intermediate stationary vanes acted upon by an axial flow of the elastic fluid. Each stage is also provided with an expansion nozzle which coöperates with the movable and stationary vanes so as to utilize the principle of fractional abstraction which is described in my Patent 566,968. I employ preferably in connection with each stage a sectional expansion nozzle such as is described in my Patent No. 700,744. The sectional nozzles H, I, J of the three stages are of this character, and they are provided with valves which enable more or less of the sections to be closed so as to utilize the principle of governing described in my Patent 566,967. For controlling the sections of the nozzle H of the first stage, I prefer to employ a series of puppet valves operated by a single cam rod, as shown in Fig. 7. The sections of the nozzle are shown as connected with four chambers 20 terminating in valve seats 21 which are closed by the puppet valves 22. The stems of these valves are surrounded by springs 23 which press the valves towards their seats. The cam rod 24 passes lengthwise through the valve case and has four cams 25 which coöperate with rollers 26 on the valve stems. This cam rod has a nut in its end with which engages a screw 27 turned by a hand wheel 28 for giving the rod a longitudinal movement. The cams 25 are set progressively at different distances from the rollers 26 so that the puppet valves will be lifted from their seats in succession, as illustrated in Fig. 7. This valve construction can be conveniently applied to the nozzle of the first stage, because that nozzle occupies only a small portion of the circumference of the turbine and the four valves can be conveniently brought into a straight line. The nozzles of the second and third stages, however, occupy greater portions of the circumference, as illustrated by dotted lines in Fig. 2, and for this reason I prefer to employ for these nozzles an independently operated valve for each division of the nozzle. A slide valve suitable for this purpose is illustrated in Figs. 8 and 9. The sections of the nozzle are connected to four chambers, one of which, 29, is shown in Fig. 9. Each of these chambers terminates in a valve seat 30, over which slides a slide valve 31 held to its seat by guides 32 and carrying a nut through which passes a screw 33 turned by a hand wheel 34. The turbine is provided with a reversing nozzle and vanes placed in the low pressure stage of the turbine, as described in my application filed November 16th 1901 (Serial No. 82,570).

Instead of employing reversing vanes located on the periphery of the wheel outside of the direct vanes and operating with an axial flow of the elastic fluid as do the direct vanes, I mount the reversing vanes upon the side of the wheel and work them by a radial flow of the elastic fluid, either inward or outward but preferably by an inward flow. This construction has several advantages: It is stronger and less expensive to build, and the regular or direct buckets of the wheel which carries the reversing buckets are placed at the greatest diameter of the wheel, thus securing for the direct operation of the turbine the benefit of the increased vane speed arising from the greater diameter. The wheel G in the final stage of the turbine has secured to its disk 11 on the exhaust side of the wheel and as near the periphery as practicable, a plate 35 upon which are supported two or more sets of movable vanes 36. These vanes are cut in blocks which are secured to the plate 35 and are closed at their outer ends by bands 37. Three sets of these movable vanes are illustrated (Figs. 1, 4 and 6). Between the movable vanes are stationary intermediate vanes 38 supported on a plate 39 secured to the side of the reversing nozzle K. This reversing nozzle is supported in the cylindrical portion of the shell of the last stage of the turbine. It may be controlled entirely by a throttling valve in the pipe leading to the nozzle, or the chamber back of the nozzle may be divided into two sections 40 to enable the use of one-half of the nozzle for securing a slow backward speed. The reversing nozzle K is constructed upon the sectional principle. The reversing nozzle receives the elastic fluid at the initial or boiler pressure the same as does the nozzle in the first stage of the turbine, but since only one stage of expansion is employed in reversing, the reversing nozzle is preferably given a greater expansion than the nozzle of the first stage of the turbine so as to utilize as nearly as practicable the entire *vis viva* of the elastic fluid. The movable and stationary vanes of the set of reversing vanes are also given the requisite divergence or expansion in the direction of flow to secure the efficient action of the elastic fluid upon the movable buckets and to compensate for the contraction produced by the decreasing diameter in the direction of flow. The final stage of the turbine is provided with an exhaust opening L which receives the elastic fluid delivered to that stage either by the direct or reversing vanes.

For supporting the turbine and making it a self-contained machine, I employ a rectangular frame M made of flanged iron beams, preferably channel or T iron, in suitable lengths, bolted or riveted to angle-pieces at the corners. This frame encircles the shell of the turbine immediately below the shaft, the lower semicircular plates 1 of the shell having lugs or feet 41 which rest on the side-pieces of the frame so that the upper half of the shell can be removed. The shaft D is supported in bearings 42 which rest on blocks 43 supported by the end cross-pieces of the frame and by additional cross-pieces of flanged iron beams, as illustrated in dotted lines in Fig. 1. The frame M thus completely encircles the turbine and furnishes a support both for the shell and for the shaft bearings. This frame is in turn supported by the foundation or structure upon which the turbine is placed. In using the turbine in a vessel, as illustrated in Fig. 10, the frame M will be bolted directly to the floor frames 44 of the vessel, the shell of the turbine hanging down between the floor frames so as to occupy as low a position in the vessel as possible. Where the floor frames are omitted or cut away to make room for the shell of the turbine, one or more brackets 45 secured to the vessel frames or keelson may be employed for supporting the frame of the turbine.

What I claim is:

1. In an elastic fluid turbine having two or more stages inclosed in separate wheel chambers, the combination of a connection between adjoining wheel chambers around the shaft, and an adjustable sleeve without packing surrounding the shaft closely over an extended area at such connection to reduce leakage between the wheel chambers, substantially as set forth.

2. In an elastic fluid turbine having two or more stages inclosed in separate wheel chambers, the combination of a connection between adjoining wheel chambers around the shaft, and an adjustable sleeve without packing surrounding the shaft at such connection to reduce leakage between the wheel chambers, such sleeve being provided with baffling grooves in its bore, substantially as set forth.

3. In an elastic fluid turbine, the combination with two or more stages inclosed in a single shell divided by diaphragms or partitions, of an adjustable sleeve surrounding the shaft without packing at the opening through each diaphragm or partition to reduce leakage between the stages of the turbine, substantially as set forth.

4. In an elastic fluid turbine, the combination with two or more stages inclosed in a single shell divided by diaphragms or partitions, of an adjustable sleeve surrounding the shaft without packing at the opening through each diaphragm or partition to reduce leakage, and baffling grooves in the bore of said sleeve, substantially as set forth.

5. In an elastic fluid turbine, the combination with a disk head or partition forming part of the shell of the turbine, of strengthening cross beams secured thereto, substantially as set forth.

6. In an elastic fluid turbine, the combination with a disk head or partition forming part of the shell of the turbine, of strengthening cross beams secured thereto, such cross beams being higher at their centers than at their ends, substantially as set forth.

7. In an elastic fluid turbine, the combination with a disk head or partition forming part of the shell of the turbine, of strengthening cross beams secured thereto, such cross beams having a T-shaped cross-section with enlarged heads, substantially as set forth.

8. In an elastic fluid turbine, the combination with a disk head or partition forming part of the shell of the turbine, of strengthening cross beams secured thereto, such cross beams having a flanged foot and an enlarged head and curving to a less height at their ends, substantially as set forth.

9. In an elastic fluid turbine, the combination of two or more wheel chambers formed of a shell closed by disk heads and divided by disk partitions or diaphragms, such disk heads and partitions being strengthened by cross beams, substantially as set forth.

10. In an elastic fluid turbine, the combination of two or more wheel chambers, each having a circumferential shell formed of semicircular flanged plates secured together at the horizontal center of the turbine, the wheel chambers' being closed and separated by undivided disk heads and partitions secured to the flanged semicircular plates, substantially as set forth.

11. In an elastic fluid turbine, the combination of two or more wheel chambers, each having a circumferential shell formed of semicircular flanged plates secured together at the horizontal center of the turbine, the wheel chambers being closed and separated by undivided disk heads and partitions secured to the flanged semicircular plates, such disk heads and partitions being strengthened by cross beams, substantially as set forth.

12. In an elastic fluid turbine, a rectangular frame composed of flanged iron beams secured together at the angles of the frame and completely encircling the shell of the turbine below its center, supports from the shell to the sides of the encircling frame, and bearings for the turbine shaft supported by the encircling frame the shell extending below the frame, substantially as set forth.

13. In an elastic fluid turbine, a supporting frame for the shell and the shaft bearings completely encircling the shell below its center, the shell extending below the frame, substantially as set forth.

14. The combination with a self-contained elastic fluid turbine having an encircling frame which carries the shaft and shell, of the floor frames of a ship upon which said turbine frame is supported, the shell hanging down between the floor frames, substantially as set forth.

15. In combination with the floor frames of a ship, of the two-part shell of an elastic fluid turbine, supported by the floor frames, the said shell being divided horizontally with the line of separation above the top of the floor frames, the shell hanging down between the floor frames, substantially as set forth.

16. In combination with the floor frames of a ship, of a turbine frame thereon, and the two-part shell of an elastic fluid turbine supported by the frame, the said shell being divided horizontally with the line of separation above the top of the floor frames, the shell hanging down between the floor frames, substantially as set forth.

17. In combination with the floor frames of a ship, of a turbine frame thereon, and the two-part shell of an elastic fluid turbine, supported by the turbine frame, the said shell being divided horizontally with the line of separation above the top of the floor frames, the shell hanging down between the floor frames, and an intermediate support engaging with and supporting the turbine frame, substantially as set forth.

18. In combination with the floor frames of a ship, of a plurality of turbine frames thereon, and the shell of an elastic fluid turbine mounted upon each of said turbine frames, and an intermediate support engaging with and supporting the turbine frames, the shells hanging down between the floor frames, substantially as set forth.

19. In an elastic fluid turbine, the combination with direct movable vanes coöperating with an axial flow of the elastic fluid, of reversing movable vanes coöperating with a radial flow of the elastic fluid and located wholly within the direct vanes, substantially as set forth.

20. In an elastic fluid turbine, the combination of a turbine wheel having two or more sets of movable direct vanes mounted on its periphery and coöperating with an axial flow of the elastic fluid, and two or more sets of movable reversing vanes mounted upon its side within the direct vanes and coöperating with a radial flow of the elastic fluid, substantially as set forth.

21. In an elastic fluid turbine, the combination with two or more stages having movable vanes and nozzles adapted to convert successive portions of the pressure into vis viva and utilize the vis viva so produced, of a set of reversing vanes and an expansion nozzle constructed to convert into vis viva more of the pressure than is converted by either of the direct nozzles and to utilize the vis viva so produced, substantially as set forth.

22. In an elastic fluid turbine, the combination with two or more stages and a nozzle and movable vanes in each stage producing and utilizing an axial flow of the elastic fluid for direct rotation of the turbine, of a nozzle and vanes in the last stage of the turbine producing and utilizing a radial flow of the elastic fluid for the reverse rotation of the turbine, such reverse vanes being located within the direct vanes, substantially as set forth.

23. In an elastic fluid turbine, the combination with a turbine wheel having vanes on its periphery for producing the direct rotation of the turbine by an axial flow of the elastic fluid, of reverse movable vanes on the side of the turbine wheel within the direct vanes for producing the reverse rotation of the wheel by an inward radial flow of the elastic fluid, a sectional nozzle mounted upon the shell and delivering the elastic fluid to the outer row of reversing vanes, and one or more sets of intermediate stationary vanes supported from the reversing nozzle, substantially as set forth.

24. In an elastic fluid turbine, the combination with a sectional nozzle, of two or more chambers with each of which two or more sections of the nozzle are connected, puppet valves for controlling the entrance of the elastic fluid into these chambers, and a cam rod for opening the puppet valves successively, substantially as set forth.

25. In an elastic fluid turbine, the combination with a sectional nozzle and two or more supply chambers connected therewith, of independently operated slide valves controlling the admission of elastic fluid to the supply chambers, substantially as set forth.

This specification signed and witnessed this 2nd day of July 1902.

CHARLES G. CURTIS.

Witnesses:
S. O. EDMONDS,
RICHD. N. DYER.